(12) United States Patent
Matsui et al.

(10) Patent No.: US 10,559,235 B2
(45) Date of Patent: Feb. 11, 2020

(54) DISPLAY APPARATUS AND ELECTRONIC EQUIPMENT WITH SUB-PIXELS HAVING RESPECTIVE AREAS

(71) Applicant: Japan Display Inc., Tokyo (JP)

(72) Inventors: Yasuyuki Matsui, Kanagawa (JP); Akira Sakaigawa, Kanagawa (JP); Masaaki Kabe, Kanagawa (JP); Kenta Seki, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 16/400,593

(22) Filed: May 1, 2019

(65) Prior Publication Data

US 2019/0259311 A1    Aug. 22, 2019

Related U.S. Application Data

(63) Continuation of application No. 15/924,567, filed on Mar. 19, 2018, now Pat. No. 10,373,533, which is a
(Continued)

(30) Foreign Application Priority Data

Nov. 25, 2011    (JP) .................................. 2011-257336

(51) Int. Cl.
   *G09G 3/36* (2006.01)
   *G09F 13/04* (2006.01)
   *G02F 1/1335* (2006.01)

(52) U.S. Cl.
   CPC ........ *G09F 13/04* (2013.01); *G02F 1/133514* (2013.01); *G09G 3/3607* (2013.01);
(Continued)

(58) Field of Classification Search
   CPC ......... G09G 3/18; G09G 3/2003–2096; G09G 3/34–38; G09G 2300/0439–0495
   See application file for complete search history.

(56) References Cited

U.S. PATENT DOCUMENTS

| 6,100,861 A | 8/2000 | Cohen et al. |
| 6,738,204 B1 | 5/2004 | Chuang et al. |

(Continued)

FOREIGN PATENT DOCUMENTS

| AU | 2010344520 B2 | 8/2011 |
| CN | 1705007 A | 12/2005 |

(Continued)

OTHER PUBLICATIONS

Chinese Office Action dated Nov. 13, 2015 for corresponding Chinese Patent Application No. 2012104826859.
(Continued)

*Primary Examiner* — Shanghyuk Park
(74) *Attorney, Agent, or Firm* — Michael Best & Friedrich LLP

(57) ABSTRACT

Disclosed herein is a display apparatus including: a first pixel including three sub-pixels for displaying three primary colors respectively; and a second pixel including three sub-pixels for displaying two colors selected among the three primary colors and a predetermined color other than the three primary colors, wherein, in the first pixel, the size of the display surface of a sub-pixel for displaying a specific color included in the three primary colors as a specific color missing from the second pixel is larger than each of the sizes of the display surfaces of the two other sub-pixels for displaying the two other primary colors respectively.

14 Claims, 11 Drawing Sheets

Related U.S. Application Data continuation of application No. 15/707,513, filed on Sep. 18, 2017, now Pat. No. 10,008,136, which is a continuation of application No. 15/395,060, filed on Dec. 30, 2016, now Pat. No. 9,818,352, which is a continuation of application No. 15/078,989, filed on Mar. 23, 2016, now Pat. No. 9,569,988, which is a continuation of application No. 13/680,572, filed on Nov. 19, 2012, now Pat. No. 9,318,033.

(52) U.S. Cl.
CPC .. *G02F 2201/52* (2013.01); *G09G 2300/0452* (2013.01); *G09G 2300/0465* (2013.01); *G09G 2300/0478* (2013.01); *G09G 2310/08* (2013.01); *G09G 2320/0233* (2013.01); *G09G 2320/0247* (2013.01); *G09G 2330/021* (2013.01)

(56) References Cited

U.S. PATENT DOCUMENTS

| | | |
|---|---|---|
| 2004/0095521 A1 | 5/2004 | Song et al. |
| 2004/0169807 A1 | 9/2004 | Rho et al. |
| 2004/0234163 A1 | 11/2004 | Lee et al. |
| 2005/0140906 A1 | 6/2005 | Baek |
| 2005/0275610 A1 | 12/2005 | Roh et al. |
| 2006/0262251 A1 | 11/2006 | Kim et al. |
| 2007/0019145 A1 | 1/2007 | Rho et al. |
| 2007/0058115 A1 | 3/2007 | Utsumi et al. |
| 2008/0084376 A1 | 4/2008 | Hirota et al. |
| 2009/0051638 A1 | 2/2009 | Horiuchi et al. |
| 2009/0153759 A1* | 6/2009 | Um .................. G09G 3/3651 349/39 |
| 2009/0167779 A1 | 7/2009 | Inuzuka |
| 2009/0262148 A1 | 10/2009 | Kimura |
| 2011/0153284 A1 | 6/2011 | Li et al. |
| 2012/0162270 A1 | 6/2012 | Fleck et al. |
| 2012/0326954 A1 | 12/2012 | Itsumi et al. |
| 2013/0088681 A1 | 4/2013 | Hisada et al. |
| 2015/0145759 A1 | 5/2015 | Chen et al. |

FOREIGN PATENT DOCUMENTS

| | | |
|---|---|---|
| CN | 101162320 A | 4/2008 |
| JP | 3167026 | 3/2001 |
| JP | 2004-004822 A | 1/2004 |
| JP | 2007-025697 A | 1/2007 |
| JP | 2007-094025 A | 4/2007 |
| JP | 2010-033014 | 2/2010 |
| KR | 10-2004-0043865 A | 5/2004 |
| KR | 10-2004-0083648 A | 10/2004 |
| WO | 2011/092913 A1 | 8/2011 |

OTHER PUBLICATIONS

Japanese Office Action dated Aug. 19, 2014 for corresponding Japanese Application No. 2011-257336.
Japanese Office Action; Application No. 2015-126541; dated Mar. 29, 2016.
Chinese Office Action dated Jan. 19, 2017 for corresponding Chinese Patent Application No. 201210482685.9.
Korean Office Action corresponding to Korean Patent Application No. 10-2012-0129890 dated Oct. 23, 2018.
Chinese Office Action dated Sep. 26, 2019 for corresponding Chinese Patent Application No. 201810252471.X.
Korean Office Action dated Oct. 14, 2019 for corresponding Korean Patent Application No. 10-2019-0090721.

* cited by examiner

F I G . 4

| SETTING | | G SUB-PIXEL DISPLAY-SURFACE SIZE | B/W SUB-PIXEL DISPLAY-SURFACE SIZE |
|---|---|---|---|
| SETTING 1 | EXISTING TECHNOLOGY | 1.0 | 1.0 |
| SETTING 2 | FIRST IMPLEMENTATION | 0.95 | 1.05 |
| SETTING 3 | | 0.90 | 1.10 |
| SETTING 4 | | 0.85 | 1.15 |
| SETTING 5 | | 0.80 | 1.20 |

G>B>1/2G
G>W>1/2G

DISPLAY APPARATUS AND ELECTRONIC EQUIPMENT WITH SUB-PIXELS HAVING RESPECTIVE AREAS

CROSS REFERENCE TO RELATED APPLICATIONS

This is a Continuation Application of patent application Ser. No. 15/924,567, filed Mar. 19, 2018, which is a Continuation Application of patent application Ser. No. 15/707, 513, filed Sep. 18, 2017, now U.S. Pat. No. 10,008,136 issued Jun. 26, 2018, which is a Continuation Application of patent application Ser. No. 15/395,060, filed Dec. 30, 2016, now U.S. Pat. No. 9,818,352 issued Nov. 14, 2017, which is a Continuation Application of the patent application Ser. No. 15/078,989, filed Mar. 23, 2016, now U.S. Pat. No. 9,569, 988 issued Feb. 14, 2017, which is a Continuation Application of the patent application Ser. No. 13/680,572, filed Nov. 19, 2012, now U.S. Pat. No. 9,318,033 issued Apr. 19, 2016, which claims priority from Japanese Priority Patent Application JP 2011-257336 filed Nov. 25, 2011, the entire contents of which are incorporated herein by reference.

BACKGROUND

The present disclosure relates to a display apparatus and electronic equipment.

In recent years, in a display apparatus such as a liquid-crystal display apparatus, an electro-luminance display apparatus or a plasma display apparatus, the power consumption for the increasing performance of the apparatus raises a problem. In particular, accompanying the higher resolution, the increased color reconstruction range or the rising luminance in typically the liquid-crystal display apparatus, the power consumed by the backlight of the display apparatus inevitably increases.

In order to solve the problem described above, there is proposed a technology providing a proposed configuration of a color image by adding a sub-pixel for displaying the W (white) color to three sub-pixels for displaying the R (red), G (green) and B (blue) primary colors respectively. The three sub-pixels for displaying the primary colors form one pixel used as the unit for formation of the color image. For details, refer to documents such as Japanese Patent No. 3167026.

By adding the sub-pixel for displaying the white color to the three sub-pixels for displaying the primary colors as described above, the luminance can be increased. In addition, if the proposed configuration including the four sub-pixels (that is, the RGBW sub-pixels) is allowed to consume the same power as the existing configuration including the three sub-pixels for displaying the primary colors, the proposed configuration will provide luminance higher than that of the existing configuration. In other words, in order to let the proposed configuration provide luminance equal to that of the existing configuration, smaller power consumption is required by the proposed configuration.

In the technology disclosed in Japanese Patent No. 3167026, however, the addition of the W sub-pixel raises the number of signal lines and the number of scanning lines by increases corresponding to the addition. Thus, the aperture ratio representing the amount of transmitted light decreases. As a result, there is raised a problem that the luminance does not increase much in spite of the fact that the W sub-pixel is added. In addition, since the number of driven lines increases, the frequency at which a pixel array section is driven also increases. Thus, there is also raised a problem that the power consumption rises undesirably.

In order to solve the problems described above, there is provided a technology disclosed in documents such as Japanese Patent Laid-open No. 2010-33014. In accordance with this technology, typically, the luminance of the entire image is increased. As a result, it is possible to insert the W sub-pixel while substantially reducing the power consumption of the backlight, displaying the image at a proper luminance and minimizing the reduction or the aperture ratio.

SUMMARY

In accordance with the existing technology disclosed in Japanese Patent Laid-open No. 2010-33014, as shown in FIG. 10 for example, the pixel array includes one B sub-pixel and one W sub-pixel at a rate of one sub-pixel per two pixels. That is to say, one of the two pixels includes RGB sub-pixels whereas the other pixel includes RGW sub-pixels. In such a configuration, the RGBW sub-pixels have the same size which is referred to as a pixel size.

In the configuration described above, as shown in FIG. 11, in the white-color chromaticity displayed as all-pixel lighting (such as 255 outputs expressed by 8 bits), there is raised a problem in which a target chromaticity is shifted to the yellow-color side which is a side of a supplementary-color system. This problem is referred to as the so-called yellow-color transition which is a shift to the yellow color. In the figure, a typical point at coordinates x=0.31 and y=0.33 in a CIE (Commission International de l'Eclairage) chromaticity diagram is taken as a target chromaticity.

This is because the pixel configuration without a W sub-pixel is designed to satisfy the white-color chromaticity target which is shown as a circle in the figure. Then, from this design, one of every two B sub-pixels is simply replaced with a W sub-pixel so that components of the blue color are not adequate. Thus, the so-called yellow-color transition occurs.

In a light blocking film referred to as a black matrix for blocking light propagating between sub-pixels or in a light blocking metal on a TFT (Thin Film Transistor) array side, on the other hand, there is adopted means for blocking light propagating through desired sub-pixels such as the G sub-pixel or both the R and G sub-pixels. By adoption of such means, it is possible to avoid the yellow-color transition which is a shift of the chromaticity of the yellow color as described above. In this case, however, a sub-pixel is simply protected against light so that there is raised a problem that the transmittance of the display panel is reduced substantially.

The above description has explained a problem caused by the yellow-color transition occurring in a configuration wherein some B sub-pixels of the sub-pixels for the three primary colors (that is, the RGB colors) are each eliminated and replaced with a W sub-pixel. Instead of replacing some B sub-pixels with W sub-pixels, however, some R or G sub-pixels can also be replaced with W sub-pixels. Also in this case, there is raised a problem that the chromaticity of the white color is shifted to the side of a supplementary-color system. In addition, this problem is raised not only in a configuration in which W sub-pixels are added to sub-pixels for the three primary colors, but also in a configuration including additional sub-pixels for displaying a supplementary-color system such as a Y (yellow) supplementary-color system or a C (cyan) supplementary-color system.

It is thus an aim of the present disclosure to provide a display apparatus capable of reducing a shift of the chromaticity of the white color to the side of a supplementary-color system in a process of configuring a pixel by adding a white sub-pixel or a supplementary-color sub-pixel to sub-pixels for the three primary colors and provide electronic equipment employing the display apparatus.

In order to achieve the aim described above, the present disclosure provides a display apparatus including:

a first pixel including three sub-pixels for displaying three primary colors respectively; and a second pixel including three sub-pixels for displaying respectively two colors selected among the three primary colors and a predetermined color other than the three primary colors.

The display apparatus is characterized in that, in the first pixel, the size of the display surface of a sub-pixel for displaying a specific color included in the three primary colors as a specific color missing from the second pixel is larger than each of the sizes of the display surfaces of the two other sub-pixels for displaying the two other primary colors respectively.

The display apparatus according to embodiments of the present disclosure can be employed in various kinds of electronic equipment, which has a display section, to serve as the display section of the equipment.

As is obvious from the above description, the second pixel is created by combining first and second sub-pixels, eliminating a third sub-pixel for displaying a specific one of the three primary colors and replacing the third sub-pixel with an additional sub-pixel for displaying a color determined in advance. Thus, the color component of the specific color missing from the second pixel decreases. As a result, the chromaticity of the white color is shifted to the side of a supplementary-color system.

In the first pixel of the display apparatus, on the other hand, the size of the display surface of a sub-pixel for displaying the specific color included in the three primary colors as the specific color missing from the second pixel is made larger than each of the sizes of the display surfaces of the two other sub-pixels for displaying the two other primary colors respectively. Thus, the effective color component of the specific color missing from the second pixel increases. As a result, it is possible to decrease a shift caused by the specific color missing from the second pixel as the shift of the chromaticity of the white color to the side of the supplementary-color system.

In order to achieve the object described above, the present disclosure provides a display apparatus having pixels each including four sub-pixels for displaying respectively the three primary colors and a predetermined color other than the three primary colors. In this display apparatus, the size of the sub-pixel for displaying a specific color selected from the three primary colors is smaller than each of the sizes of the sub-pixels for displaying the two other primary colors but larger than half the size of each of the sub-pixels for displaying the two other primary colors. The display apparatus according to the embodiments of the present disclosure can be employed in various kinds of electronic equipment, which has a display section, to serve as the display section of the equipment.

As described above, in each pixel, the size of the sub-pixel for displaying a specific color selected from the three primary colors is made smaller than each of the sizes of the sub-pixels for displaying the two other primary colors so that an area can be made available in the pixel due to the smaller size of the sub-pixel for displaying the specific color selected from the three primary colors. Thus, it is possible to place the sub-pixel for displaying the predetermined color in the available area. In addition, since each pixel has the sub-pixel for displaying the predetermined color, the display performance can be enhanced. For example, the luminance can be increased. On top of that, the size of the sub-pixel for displaying the specific color selected from the three primary colors is made larger than half the size of each of the sub-pixels for displaying the two other primary colors. Thus, the component of the specific color can be made greater than that of a case in which the size of the sub-pixel for displaying the specific color selected from the three primary colors is made equal to half the size of each of the sub-pixels for displaying the two other primary colors. As a result, it is possible to decrease the shift of the chromaticity of the white color to the side of the supplementary-color system.

The display apparatus according to the embodiment of the present disclosure is capable of increasing the effective color component of a specific color, which is missing from the second pixel, in the first pixel. Thus, it is possible to decrease a shift caused by the specific color missing from the second pixel as the shift of the chromaticity of the white color to the side of the supplementary-color system.

In addition, in accordance with the other display apparatus according to the embodiment of the present disclosure, in each pixel, the size of the sub-pixel for displaying a specific color selected from the three primary colors is reduced so that an area can be made available in the pixel due to the smaller size of the sub-pixel for displaying the specific color. Thus, it is possible to place a sub-pixel for displaying a color determined in advance in the available area. On top of that, the component of the specific color can be increased because the size of the sub-pixel for displaying the specific color is made larger than half the size of each of the sub-pixels for displaying the two other primary colors. Accordingly, it is possible to decrease the shift of the chromaticity of the white color to the side of the supplementary-color system.

BRIEF DESCRIPTION OF THE DRAWINGS

FIG. 4 is a table comparing the size of the display surface of a G sub-pixel with the sizes of the display surfaces of B and W sub-pixels;

DETAILED DESCRIPTION OF THE PREFERRED EMBODIMENTS

Figure 1:
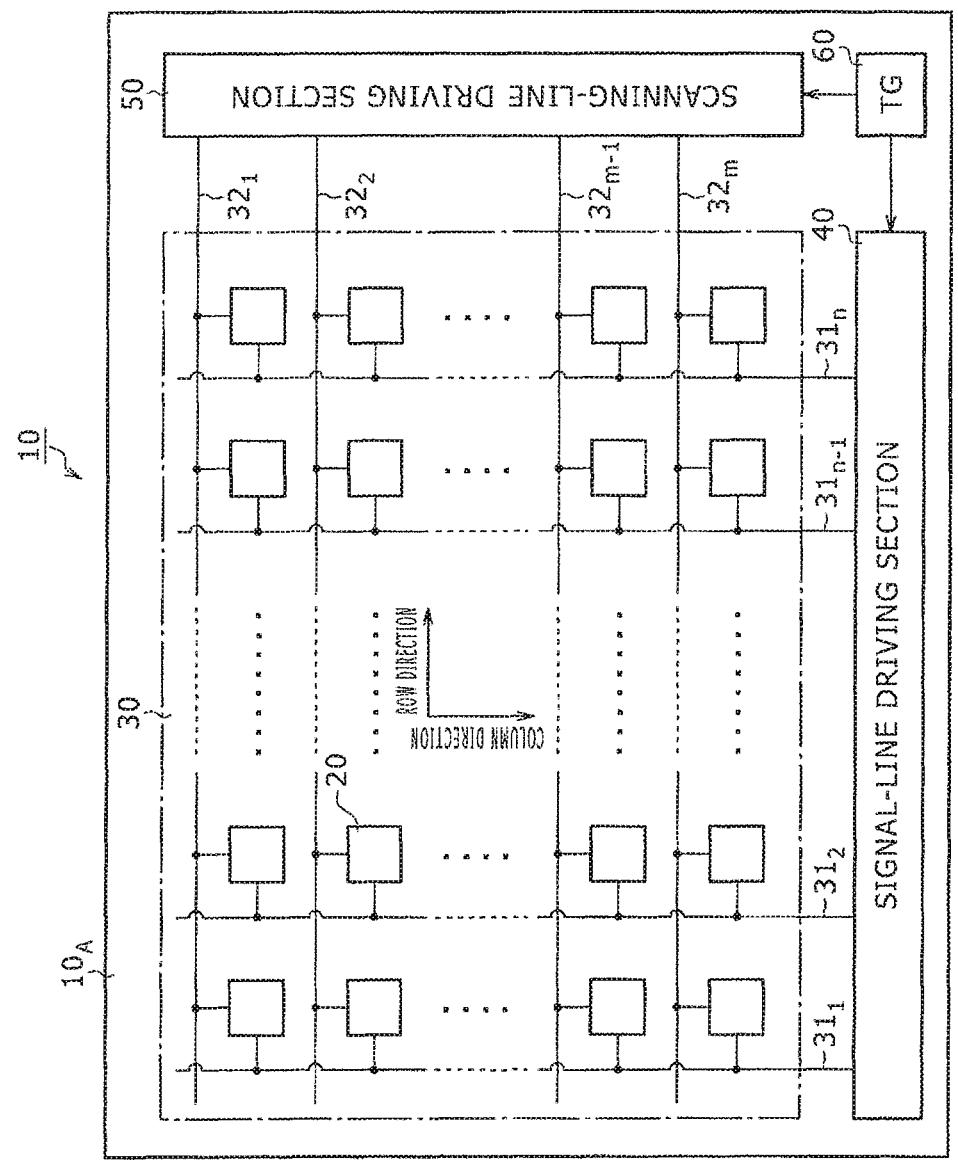
FIG. 1 is a system configuration diagram showing a rough configuration of a liquid-crystal display apparatus having an active matrix type in accordance with an embodiment of the present disclosure.

By referring to the diagrams, the following description explains details of embodiments which are each an implementation of the technology according to the present disclosure. However, implementations of the present disclosure are by no means limited to the embodiments. For example, a variety of numbers used in the embodiments are typical. In the following description, the same elements or elements having the same functions are denoted by the same reference numeral and such elements are explained only once. It is to be noted that the following description explains the embodiments in the following order:
1: General Explanation of the Display Apparatus According to an Embodiment of the Disclosure
2: Liquid-Crystal Display Apparatus According to the Disclosure
2-1: System Configuration
2-2: Pixel Circuit
3: First Embodiment (Pixel Including Three Sub-pixels)
3-1: First Typical Implementation
3-2: Second Typical Implementation
3-3: Third Typical Implementation
4: Second Embodiment (Pixel Including Four Sub-pixels)
4-1: Typical Implementation
5: Liquid-Crystal Display Apparatus of a Horizontal Electric-Field Mode
6: Electronic Equipment
7: Configurations of the Disclosure

1: General Explanation of the Display Apparatus According to an Embodiment of the Disclosure The display apparatus according to an embodiment of the present disclosure is a display apparatus for showing color displays. The unit for creating a color image on a pixel array included in the display apparatus is referred to as a pixel including three or four sub-pixels. That is to say, the pixel array includes a plurality of pixels each including either three or four sub-pixels. The display apparatus for showing color displays can be a commonly known display apparatus such as a liquid-crystal display apparatus, an electro-luminance display apparatus or a plasma display apparatus.

The pixel array includes a plurality of pixels which may each include either three or four sub-pixels. In either case, the pixels each include three sub-pixels for displaying three primary colors, that is, the R (red), G (green) and B (blue) primary colors respectively. By turning on all the three sub-pixels at the same time, a white color can be displayed. In addition, a combination of sub-pixels to be turned on allows a desired color to be displayed.

In addition to the sub-pixels for displaying the R, G and B primary colors, a sub-pixel for displaying a predetermined color other than the R, G and B primary colors can be provided in order to enhance the display performance. To put it concretely, by adding a sub-pixel for displaying typically the W (white) color as the predetermined color, the luminance can be increased. In addition, by adding a sub-pixel for displaying a supplementary-color system such as a Y (yellow) supplementary-color system or a C (cyan) supplementary-color system, the color reconstruction range can be widened.

Pixel Including Three Sub-Pixels

In the case of a pixel array including pixels each including three sub-pixels, it is desirable that the pixel array is configured into a configuration in which first pixels each including three sub-pixels for displaying three primary colors respectively as well as second pixels each including three sub-pixels for displaying two colors selected among the three primary colors and a predetermined color other than the three primary colors are laid out alternately in the row and column directions. In this case, the row direction is defined as a direction parallel to the directions of the pixel rows. That is to say, the row direction is a direction in which pixels are laid out on a pixel row. On the other hand, the column direction is defined as a direction parallel to the directions of the pixel columns. That is to say, the column direction is a direction in which pixels are laid out on a pixel column.

In the first pixel, it is desirable to provide a configuration in which the size (or the area) of the display surface of a sub-pixel for displaying a specific color included in the three primary colors as a specific color missing from the second pixel is made larger than each of the sizes of the display surfaces of the two other sub-pixels for displaying the two other primary colors respectively. In this case, the word 'larger' means not only 'strictly larger,' but also 'substantially larger.' Existence of a variety of variations generated at the design stage or the manufacturing stage is tolerated.

In addition, the display surface of a sub-pixel is defined as a surface contributing to the image display of the sub-pixel. Thus, the size of the display surface is determined by the size of the sub-pixel itself. As an alternative, the display surface of a sub-pixel can also be an aperture area which is the size of an aperture created on the display surface by a light blocking film referred to as the so-called black matrix for blocking light propagating between sub-pixels.

In the second pixel, it is possible to provide a configuration in which the size of the display surface of a sub-pixel for displaying the predetermined color is larger than each of the sizes of the display surfaces of the two other sub-pixels for displaying the two other primary colors respectively. In this configuration, it is desirable that the size of the display surface of a sub-pixel included in the first pixel to serve as a sub-pixel for displaying a specific color included in the three primary colors as a specific color missing from the second pixel is equal to the size of the display surface of a sub-pixel included in the second pixel to serve as a sub-pixel for displaying the predetermined color. With such a configuration, it is possible to provide a stripe array in which the sub-pixels for displaying the specific color included in the three primary colors and the sub-pixels for displaying the predetermined color are laid out to form a straight line in the column direction.

In the second pixel, it is desirable that the specific color included in the three primary colors as a specific color missing from the second pixel is the B (blue) color which has the lowest spectral luminous efficiency among the three primary colors. However, the two primary colors other than the B (blue) color are not ruled out. As described before, the two primary colors other than the B (blue) color are the R (red) and G (green) colors. In addition, it is desirable that the additional predetermined color used as a replacement for the specific color included in the three primary colors as a specific color missing from the second pixel is the W (white) color.

If the specific color included in the three primary colors as a specific color missing from the second pixel is the blue color and the additional predetermined color used as a replacement for the specific color is the white color, in the first pixel, it is desirable to provide a configuration in which the size of the display surface of the sub-pixel for displaying the blue color is made larger than the size of the display surface of the sub-pixel for displaying the green color. In this case, the word 'larger' means not only 'strictly larger,' but also 'substantially larger.' Existence of a variety of variations generated at the design stage or the manufacturing stage is tolerated.

In addition, in the second pixel, it is desirable to provide a configuration in which the size of the display surface of the sub-pixel for displaying the white color is made larger than the size of the display surface of the sub-pixel for displaying the green color. In this case, in the first and second pixels, it is possible to provide a configuration in which the size of the display surface of the sub-pixel for displaying the red color is made larger than the size of the display surface of the sub-pixel for displaying the green color.

As an alternative, in the first and second pixels, it is possible to provide a configuration in which the size of the display surface of the sub-pixel for displaying the red color is made equal to the size of the display surface of the sub-pixel for displaying the green color. In this case, it is desirable to provide a configuration in which the size of the display surface of the sub-pixel for displaying the blue color in the first pixel and the size of the display surface of the sub-pixel for displaying the white color in the second pixel are each made larger than the sum of the size of the display surface of the sub-pixel for displaying the red color and the size of the display surface of the sub-pixel for displaying the green color.

As another alternative, in the first and second pixels, it is possible to provide a configuration in which the size of the display surface of the sub-pixel for displaying the green color is made larger than the size of the display surface of the sub-pixel for displaying the red color.

As is obvious from the above description, the second pixel is created by combining first and second sub-pixels, eliminating a third sub-pixel for displaying a specific one of the three primary colors and replacing the third sub-pixel with an additional sub-pixel for displaying a color determined in advance. Thus, the color component of the specific color missing from the second pixel decreases. To be more specific, the color component of the specific color missing from the second pixel decreases by half. As a result, the chromaticity of the white color is shifted to the side of a supplementary-color system.

In the case of the display apparatus according to the embodiment of the present disclosure, on the other hand, in the first pixel, the size of the display surface of a sub-pixel for displaying a specific color included in the three primary colors as a specific color missing from the second pixel is made larger than each of the sizes of the display surfaces of the two other sub-pixels for displaying the two other primary colors respectively. Thus, the effective color component of the specific color missing from the second pixel increases. As a result, it is possible to decrease a shift caused by the disappearance of the specific color from the second pixel as the shift of the chromaticity of the white color to the side of the supplementary-color system.

In addition, without means adopted in a light blocking film referred to as a black matrix or in a light blocking metal on a TFT array side to serve as means for blocking light propagating through desired sub-pixels, it is possible to decrease the shift of the chromaticity of the white color to the side of the supplementary-color system. Thus, it is possible to improve performance deteriorations caused by the yellow-color transition of the chromaticity of the white color while sustaining the transmittance of the display panel.

Pixel Including Four Sub-Pixels

In the case of a pixel array including pixels each including four sub-pixels, the four sub-pixels display the three primary colors and a predetermined color other than the three primary colors. In such a pixel array, it is desirable to provide a configuration in which the pixels are laid out repeatedly in the row and column directions. As described above, the row direction is defined as a direction parallel to the directions of the pixel rows. That is to say, the row direction is a direction in which pixels are laid out on a pixel row. On the other hand, the column direction is defined as a direction parallel to the directions of the pixel columns. That is to say, the column direction is a direction in which pixels are laid out on a pixel column.

In each pixel, it is desirable to provide a configuration in which the size of the sub-pixel for displaying a specific color selected from the three primary colors is made smaller than the each of the sizes of the sub-pixels for displaying the two other primary colors but larger than half the size of each of the sub-pixels for displaying the two other primary colors. In this case, the word 'smaller' means not only 'strictly smaller,' but also 'substantially smaller' whereas the word 'larger' means not only 'strictly larger,' but also 'substantially larger.' Existence of a variety of variations generated at the design stage or the manufacturing stage is tolerated.

In addition, the size of the display surface of a sub-pixel is defined as the size of the sub-pixel itself and the light blocking film referred to as the black matrix is not included. In other words, since signal lines are provided in the column direction between sub-pixels, the size of a sub-pixel is determined by the distance between two adjacent signal lines.

In each pixel, it is possible to provide a configuration in which the size of the sub-pixel for displaying a specific color selected from the three primary colors is made equal to the size of the sub-pixel for displaying the predetermined color. In this case, the word 'equal' means not only 'strictly equal,' but also 'substantially equal.' Existence of a variety of variations generated at the design stage or the manufacturing stage is tolerated.

It is desirable that the specific color displayed by the sub-pixel having a small size is the B (blue) color which has the lowest spectral luminous efficiency among the three primary colors. However, the two primary colors other than the B (blue) color are not ruled out. As described before, the two primary colors other than the B (blue) color are the R (red) and G (green) colors. In addition, it is desirable that the predetermined color added to the three primary colors is the W (white) color.

If the specific color displayed by the sub-pixel having a small size is the blue color and the predetermined color is the W white color, it is possible to provide a configuration in which the size of the sub-pixel for displaying the blue color is made smaller than each of the sizes of the sub-pixels for displaying the red and green primary colors but larger than half the size of each of the sub-pixels for displaying the red and green primary colors. In this case, it is desirable that the size of the sub-pixel for displaying the red color is made equal to the size of the sub-pixel for displaying the green color.

As described above, the size of the sub-pixel for displaying a specific color selected from the three primary colors is made smaller than the sizes of the sub-pixels for displaying the two other primary colors so that the size of the sub-pixel for displaying the specific color becomes smaller. Due to the small size of the sub-pixel for displaying the specific color, it is possible to provide an available area in which the sub-pixel for displaying the predetermined color is provided. Thus, each pixel is provided with the sub-pixel for displaying the predetermined color so that the display performance can be enhanced. For example, if the white color is taken as the predetermined color, the luminance can be increased.

In addition, as described above, the size of the sub-pixel for displaying the specific color selected from the three primary colors is made smaller than each of the sizes of the sub-pixels for displaying the two other primary colors but larger than half the size of each of the sub-pixels for displaying the two other primary colors. Thus, the component of the specific color can be made larger than that of a configuration in which the size of the sub-pixel for displaying the specific color is made equal to half the size of each of the sub-pixels for displaying the two other primary colors. As a result, it is possible to decrease the shift of the chromaticity of the white color to the side of the supplementary-color system.

On top of that, since each pixel includes sub-pixels for displaying all the three primary colors, the resolution can be enhanced.

In addition, without means adopted in a light blocking film referred to as a black matrix or in a light blocking metal on a TFT array side to serve as means for blocking light propagating through desired sub-pixels, it is possible to decrease the shift of the chromaticity of the white color to the side of the supplementary-color system. Thus, it is possible to improve performance deteriorations caused by the yellow-color transition of the chromaticity of the white color while sustaining the transmittance of the display panel.

2: Liquid-Crystal Display Apparatus According to the Disclosure 2-1: System Configuration FIG. 1 is a system configuration diagram showing a rough configuration of a display apparatus 10 according to the embodiment of the present disclosure. A typical example of the display apparatus according to the embodiment of the present disclosure is a liquid-crystal display apparatus having an active matrix type. In the following description, a liquid-crystal display apparatus is taken as a typical example of the display apparatus according to the embodiment of the present disclosure. However, examples of the display apparatus according to the embodiment of the present disclosure are by no means limited to a liquid-crystal display apparatus. That is to say, the display apparatus according to the embodiment of the present disclosure can be any commonly known display apparatus such as an electro-luminance display apparatus or a plasma display apparatus.

The liquid-crystal display apparatus has a panel structure including two substrates not shown in the figure. At least, one of the substrates is a transparent one. The two substrates face each other and are separated from each other by a gap determined in advance. Liquid crystals are enclosed in the gap between the two substrates. The operating mode of the liquid-crystal display apparatus also referred to as a liquid-crystal display panel is not prescribed in particular. For example, the liquid-crystal display apparatus can be configured to be driven in the so-called TN mode, a VA mode or an IPS mode.

As shown in FIG. 1, the liquid-crystal display apparatus 10 according to a typical implementation of an embodiment includes a pixel array section 30 and a driving section provided at locations surrounding the pixel array section 30. The pixel array section 30 has a plurality of pixels 20 each including a liquid-crystal capacitor. The pixels 20 are laid out two-dimensionally to form a pixel matrix on the pixel array section 30. The driving section includes a signal-line driving section 40, a scanning-line driving section 50 and a driving-timing generation section 60. Typically, the driving section is integrated on the same substrate, which serves as the liquid-crystal display panel $11_A$, as the pixel array section 30. Integrated in such a state, the driving section drives the pixels 20 included in the pixel array section 30.

In the liquid-crystal display apparatus 10 shown in FIG. 1, the pixels 20 form a matrix consisting of m rows and n columns on the pixel array section 30. In the pixel matrix, signal lines $31_1$ to $31_n$ are stretched in the column direction. In the following description, each of the signal lines $31_1$ to $31_n$ is also referred to simply as a signal line 31 in some cases. The signal line 31 is provided for each pixel column. In addition, in the pixel matrix, scanning lines $32_1$ to $32_m$ are stretched in the row direction. In the following description, each of the scanning lines $32_1$ to $32_m$ is also referred to simply as a scanning line 32 in some cases. The scanning line 32 is provided for each pixel row.

A specific end of each of the signal lines $31_1$ to $31_n$ is connected to an output terminal of a column of the signal-line driving section 40. The signal-line driving section 40 operates to output a signal electric potential reflecting a gradation to the signal line 31 supposed to receive the electric potential.

A specific end of each of the scanning lines $32_1$ to $32_m$ is connected to an output terminal of a row of the scanning-line driving section 50. The scanning-line driving section 50 controls operations to write the signal electric potentials, which have been output by the signal-line driving section 40 to the signal lines $31_1$ to $31_n$ as signal electric potentials each reflecting a gradation, into the pixels 20.

The driving-timing generation section 60 also referred to as a TG (Timing Generator) provides the signal-line driving section 40 and the scanning-line driving section 50 with a variety of driving pulses also referred to as timing signals for driving the signal-line driving section 40 and the scanning-line driving section 50.

2-2: Pixel Circuit

Figure 2:
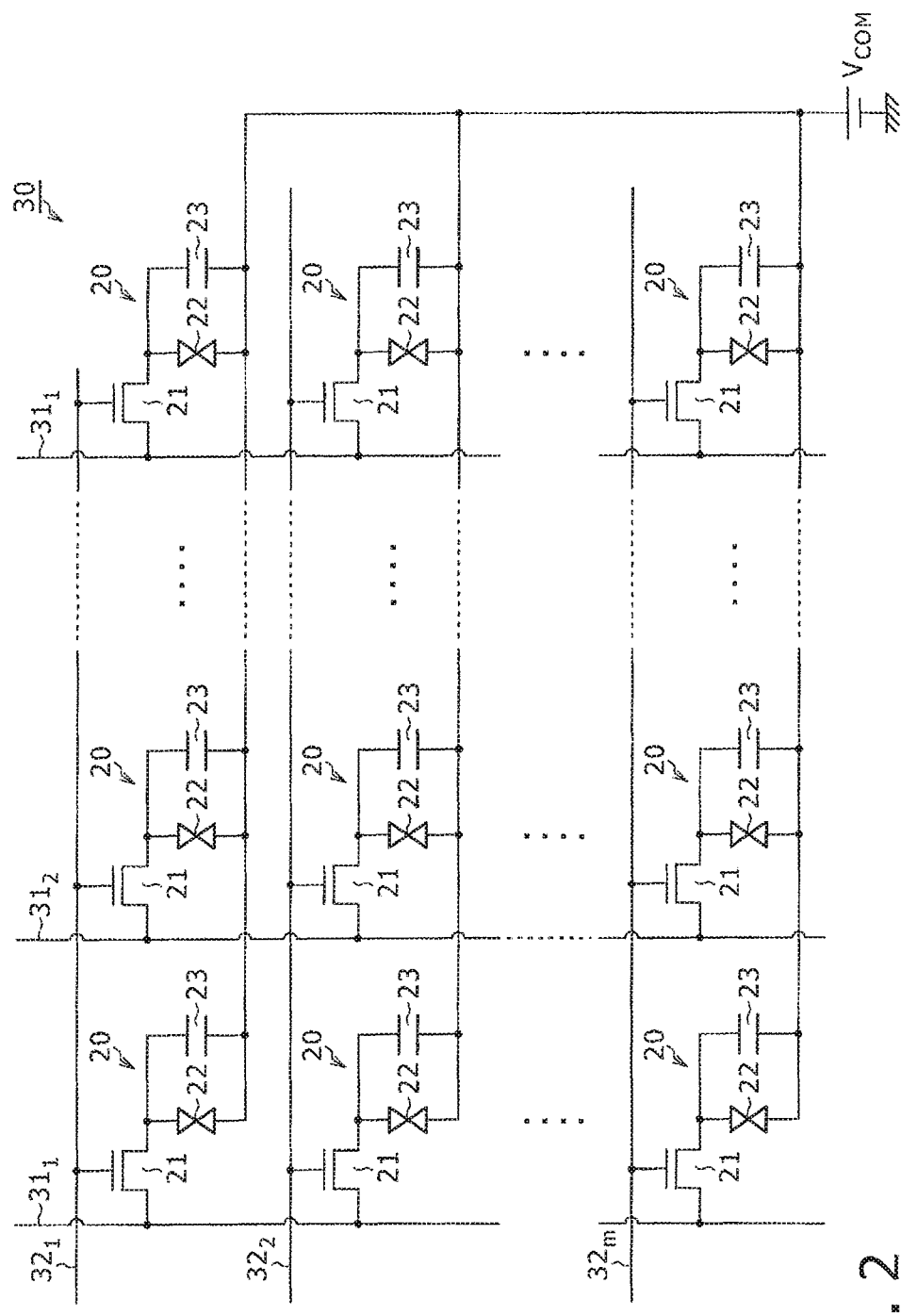
FIG. 2 is a circuit diagram showing basic circuit configurations of pixels.

Next, by referring to FIG. 2, the following description explains the basic circuit configuration of the pixels 20 composing the pixel array section 30.

As shown in FIG. 2, a plurality of signal lines 31 (that is, signal lines $31_1$ to $31_n$) are provided to intersect a plurality of scanning lines 32 (that is, scanning lines $32_1$ to $31_m$) at intersections and, at each of the intersections, a pixel array section 30 is created.

The pixel 20 typically includes a pixel transistor 21, a liquid-crystal capacitor 22 and an electric-charge holding capacitor 23. The pixel transistor 21 is typically a TFT (Thin Film Transistor). The gate electrode of the pixel transistor 21 is connected to a scanning line 32 (that is, one of the scanning lines $32_1$ to $32_m$). On the other hand, a specific one of the source and drain electrodes of the pixel transistor 21 is connected to a signal line 31 (that is, one of the signal lines $31_1$ to $31_n$).

The liquid-crystal capacitor 22 implies a capacitive component of a liquid-crystal material generated between a pixel electrode and an opposite electrode created to face the pixel electrode. The pixel electrode of the liquid-crystal capacitor 22 is connected to the other one of the source and drain electrodes of the pixel transistor 21. A DC common voltage $V_{com}$ common to all pixels 20 is applied to the opposite electrode of the liquid-crystal capacitor 22. A specific electrode of the electric-charge holding capacitor 23 is connected to the pixel electrode of the liquid-crystal capacitor 22 whereas the other electrode of the electric-charge holding capacitor 23 is connected to the opposite electrode of the liquid-crystal capacitor 22.

By the way, in the case of a display apparatus for showing color displays, that is, in the case of a liquid-crystal display apparatus taken as an example of the display apparatus, each pixel 20 shown in FIGS. 1 and 2 serves as each of sub-pixels included in a pixel used as a unit in formation of a color image.

3: First Embodiment

The pixel array according to the first embodiment is a pixel array in which one pixel used as a unit in formation of a color image includes three sub-pixels. In addition, each pixel in the pixel array according to the first embodiment can be a first pixel including three sub-pixels for displaying three primary colors respectively or a second pixel including three sub-pixels for displaying two colors selected among the three primary colors and a predetermined color other than the three primary colors. The first and second pixels are laid out alternately in the row and column directions.

The first pixel of the pixel array according to the first embodiment is characterized in that the size of the display surface of a sub-pixel for displaying a specific color included in the three primary colors as a specific color missing from the second pixel is larger than each of the sizes of the display surfaces of the two other sub-pixels for displaying the two other primary colors respectively.

The following description explains concrete typical implementations of the pixel array according to the first embodiment. In these typical implementations, the specific color included in the three primary colors as a specific color missing from the second pixel is the B (blue) color whereas, in the second pixel, the predetermined color serving as a substitute for the B (blue) color missing from the second pixel is the W (white) color.

3-1: First Typical Implementation

Figure 3:
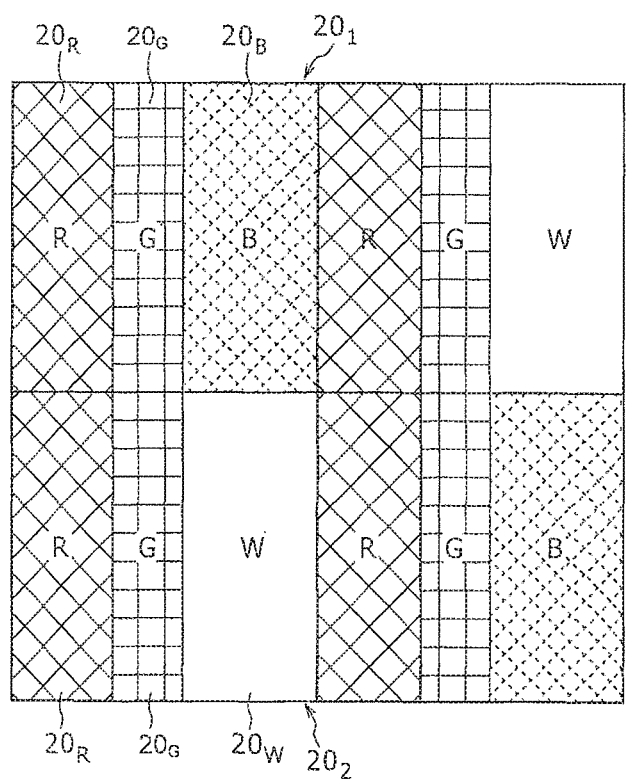
FIG. 3 is a diagram showing the top view of a pixel array according to a first typical implementation of a first embodiment.

FIG. 3 is a diagram showing the top view of a pixel array according to a first typical implementation of the first embodiment. In order to simplify the figure, the figure shows only four adjacent pixels on the upper, lower, left and right sides respectively.

As shown in FIG. 3, the pixel array according to the first typical implementation includes two first pixels $20_1$ and two second pixels $20_2$. The two first pixels $20_1$ each include three sub-pixels for displaying three primary colors respectively whereas the two second pixels $20_2$ each include three sub-pixels for displaying respectively two colors selected among the three primary colors and a predetermined color other than the three primary colors. The two first pixels $20_1$ and the two second pixels $20_2$ are laid out alternately in the row and column directions to form a pixel matrix.

To put it in detail, the first pixel $20_1$ is configured to include three sub-pixels $20_R$, $20_G$ and $20_B$ for displaying the three RGB primary colors respectively. In this first pixel $20_1$, the size of the display surface of the R sub-pixel $20_R$ is about ⅓ of the total size of the entire first pixel $20_1$. On the other hand, the size of the display surface of the G sub-pixel $20_G$ is made smaller than the size of the display surface of the R sub-pixel $20_R$. For example, the size of the display surface of the G sub-pixel $20_G$ is set at about 80% of the size of the display surface of the R sub-pixel $20_R$.

Then, the remaining area becoming available in the first pixel $20_1$ is allocated to the B sub-pixel $20_B$. Thus, in the first pixel $20_1$, the relations between the sizes of the display surfaces of the R sub-pixel $20_R$, the G sub-pixel $20_G$ and the B sub-pixel $20_B$ can be described as follows. The size of the display surface of the B sub-pixel $20_B$ is largest whereas the size of the display surface of the G sub-pixel $20_G$ is smallest. That is to say, the size of the display surface of the R sub-pixel $20_R$ is between the size of the display surface of the B sub-pixel $20_B$ and the size of the display surface of the G sub-pixel $20_G$.

The second pixel $20_2$ is configured to include three sub-pixels. The three sub-pixels include two sub-pixels $20_R$ and $20_G$ for displaying the R and G primary colors respectively in addition to a sub-pixel $20_W$ for displaying the predetermined color which is the white color. In this second pixel $20_2$, the size of the display surface of the R sub-pixel $20_R$ is about ⅓ of the total size of the entire second pixel $20_2$. That is to say, the size of the display surface of the R sub-pixel $20_R$ in the second pixel $20_2$ is about equal to the size of the display surface of the R sub-pixel $20_R$ in the first pixel $20_1$. Thus, it is possible to provide a stripe array in which the R sub-pixels $20_R$ are laid out to form a straight line in the column direction.

In the second pixel $20_2$, the size of the display surface of the G sub-pixel $20_G$ is made smaller than the size of the display surface of the R sub-pixel $20_R$. For example, the size of the display surface of the G sub-pixel $20_G$ is set at about 80% of the size of the display surface of the R sub-pixel $20_R$. That is to say, the size of the display surface of the G sub-pixel $20_G$ in the second pixel $20_2$ is about equal to the size of the display surface of the G sub-pixel $20_G$ in the first pixel $20_1$. Thus, it is possible to provide a stripe array in which the G sub-pixels $20_G$ are laid out to form a straight line in the column direction.

Then, the remaining area becoming available in the second pixel $20_2$ is allocated to the W sub-pixel $20_W$.

The size of the display surface of the W sub-pixel $20_W$ is about equal to the size of the display surface of the B sub-pixel $20_B$. Thus, it is possible to provide a stripe array in which the B sub-pixels $20_B$ and the W sub-pixels $20_W$ are laid out alternately to form a straight line in the column direction.

By the same token, in the second pixel $20_2$, the relations between the sizes of the display surfaces of the R sub-pixel $20_R$, the G sub-pixel $20_G$ and the W sub-pixel $20_W$ can be described as follows. The size of the display surface of the W sub-pixel $20_W$ is largest whereas the size of the display surface of the G sub-pixel $20_G$ is smallest. That is to say, the size of the display surface of the R sub-pixel $20_R$ is between the size of the display surface of the W sub-pixel $20_W$ and the size of the display surface of the G sub-pixel $20_G$.

As described above, the pixel array according to the first typical implementation is configured to include the first pixel $20_1$ including three sub-pixels $20_R$, $20_G$ and $20_B$ for displaying the three RGB primary colors respectively as well as the second pixel $20_2$ including two sub-pixels $20_R$ and $20_G$ for displaying the R and G primary colors respectively and a sub-pixel $20_W$ for displaying the white color. In addition, the pixel array according to the first typical implementation is configured into a configuration in which, in a process of adding the W sub-pixel $20_W$ to the second pixel $20_2$ to serve as a substitute for the B sub-pixel $20_B$ missing from the second pixel $20_2$, the size (or the area) of the display surface of the G sub-pixel $20_G$ is reduced in order to enlarge the size of the display surface of the B sub-pixel $20_B$ by an increase determined by the reduction of the size of the display surface of the G sub-pixel $20_G$.

By adopting such a configuration, the effective color component of the B color missing from the second pixel $20_2$ is increased. Thus, it is possible to decrease a shift caused by the disappearance of the B color from the second pixel $20_2$ as the shift of the chromaticity of the white color to the side of the supplementary-color system. In addition, without means adopted in a light blocking film referred to as a black matrix or in a light blocking metal on a TFT array side to serve as means for blocking light propagating through desired sub-pixels, it is possible to decrease the shift of the chromaticity of the white color to the side of the supplementary-color system. Thus, it is possible to improve performance deteriorations caused by the yellow-color transition of the chromaticity of the white color while sustaining the transmittance of the display panel.

Figure 5:
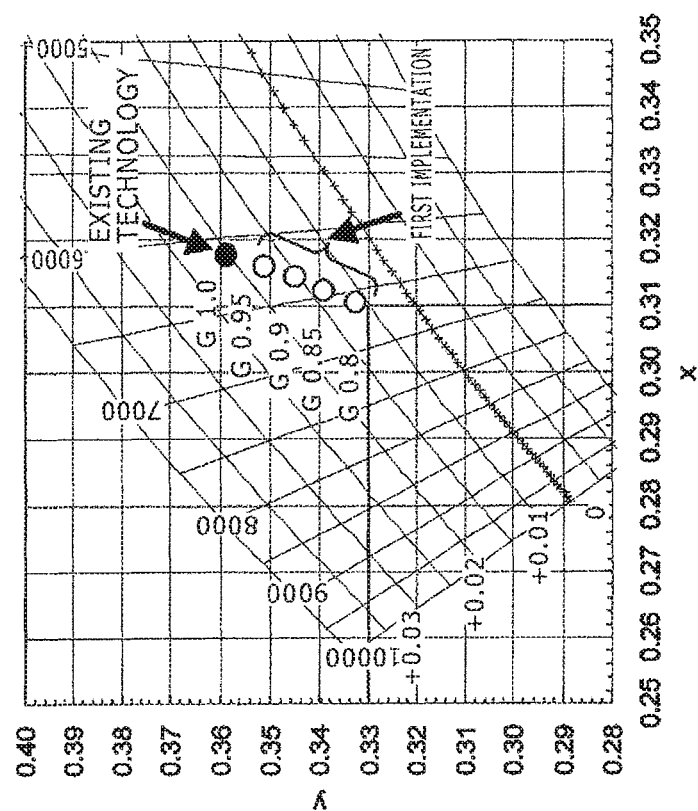
FIG. 5 is a diagram showing a chromaticity characteristic of the white color for the first typical implementation.
Figure 6:
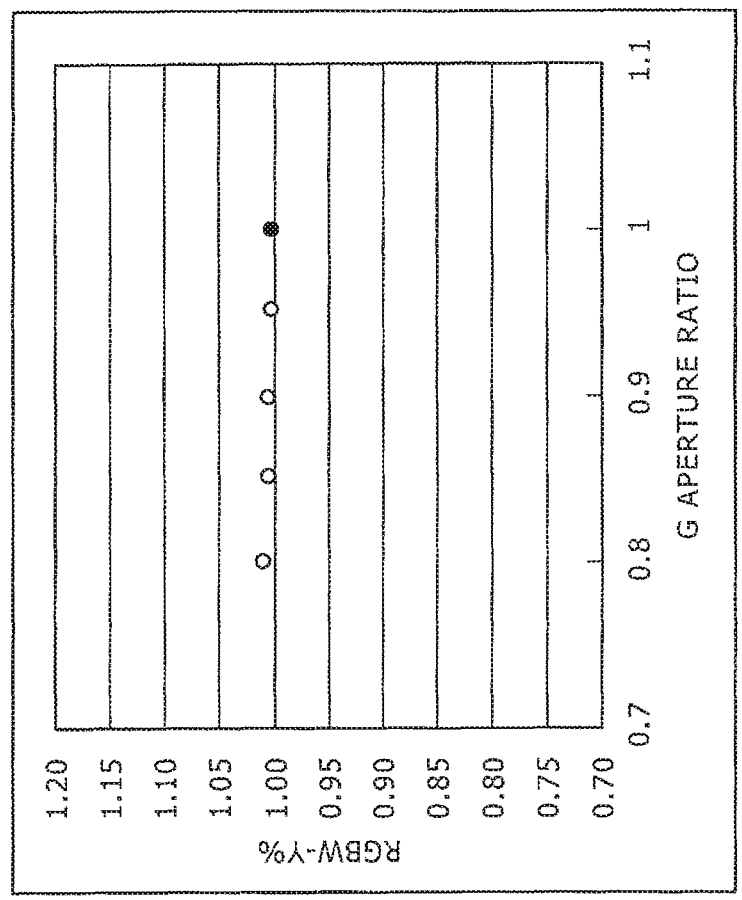
FIG. 6 is a diagram showing a relation between the aperture ratio and the panel transmittance (or the luminance) for the first typical implementation.

In this case, as shown in FIG. 4, designs 1 to 5 are conceivable. In these designs, the size of the display surface of the G sub-pixel $20_G$ is changed by a multiplying factor in a range of 1.0 to 0.8 whereas the sizes of the display surfaces of the B sub-pixel $20_B$ and the W sub-pixel $20_W$ are changed by a multiplying factor in a range of 1.0 to 1.2. With such designs, the chromaticity of the white color is shown in FIG. 5 whereas the transmittance of the display panel is shown in FIG. 6. It is to be noted that the multiplying factor of 1 is used for the size of a display surface for a case in which the pixel is divided equally into three sub-pixels. That is to say, the multiplying factor of 1 corresponds to a display-surface size equal to ⅓ of the size of the pixel.

First of all, changes to settings 1 to 5 corresponding to designs 1 to 5 respectively are examined to check an effect on the chromaticity of the white color. If the size of the display surface of the G sub-pixel $20_G$ is reduced whereas the size of the display surface of the B sub-pixel $20_B$ is increased as shown in FIG. 4, performance deteriorations caused by the yellow-color transition of the chromaticity of the white color are improved. That is to say, as is obvious from FIG. 5, the chromaticity of the white color gradually changes to match a target chromaticity.

Next, changes to settings 1 to 5 are examined to check an effect on the transmittance of the display panel. If the size of the display surface of the G sub-pixel $20_G$ is reduced, the transmittance of the G sub-pixel $20_G$ decreases. However, the size of the display surface of the W sub-pixel $20_W$ is increased at the same time. Thus, the transmittance of the W sub-pixel $20_W$ increases so that it is obvious that the transmittance of the display panel does not change as shown in FIG. 6. That is to say, with the changes to settings 1 to 5, it is possible to improve performance deteriorations caused by the yellow-color transition of the chromaticity of the white color while sustaining the transmittance of the display panel.

3-2: Second Typical Implementation

Figure 7:
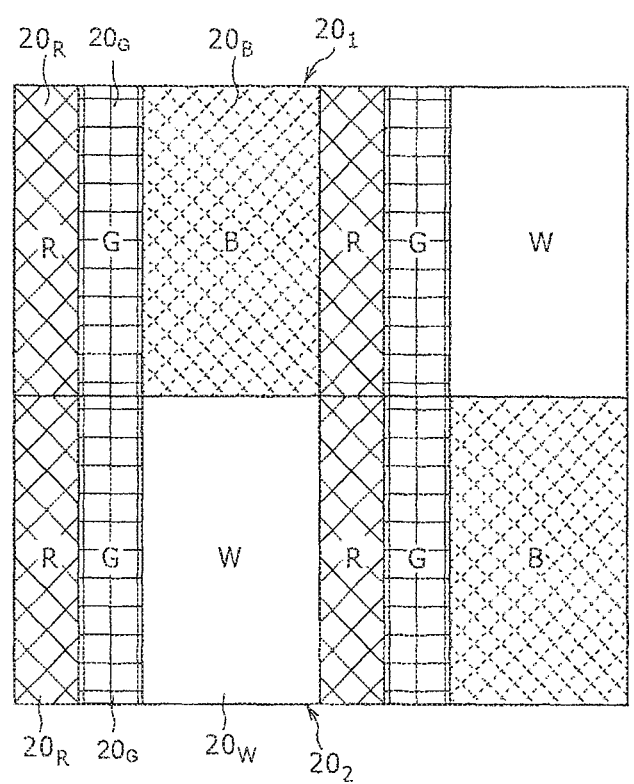
FIG. 7 is a diagram showing the top view of a pixel array according to a second typical implementation of the first embodiment.

FIG. 7 is a diagram showing the top view of a pixel array according to a second typical implementation of the first embodiment. Also in this case, in order to simplify the figure, the figure shows only four adjacent pixels on the upper, lower, left and right sides respectively.

As shown in FIG. 7, in the same way as the pixel array according to the first typical implementation, the pixel array according to the second typical implementation also includes two first pixels $20_1$ and two second pixels $20_2$. The two first pixels $20_1$ each include three sub-pixels for displaying three primary colors respectively whereas the two second pixels $20_2$ each include three sub-pixels for displaying respectively two colors selected among the three primary colors and a predetermined color other than the three primary colors. The two first pixels $20_1$ and the two second pixels $20_2$ are laid out alternately in the row and column directions to form a pixel matrix.

To put it in detail, the first pixel $20_1$ is configured to include three sub-pixels $20_R$, $20_G$ and $20_B$ for displaying the three RGB primary colors respectively. In this first pixel $20_1$, the sizes of the display surfaces of the R sub-pixel $20_R$ and the G sub-pixel $20_G$ are each made smaller than ⅓ of the total size of the entire first pixel $20_1$. For example, the sizes of the display surfaces of the R sub-pixel $20_R$ and the G sub-pixel $20_G$ are each set at about 80% of ⅓ of the total size of the entire first pixel $20_1$. Then, the remaining area becoming available in the first pixel $20_1$ is allocated to the B sub-pixel $20_B$.

Thus, in the first pixel $20_1$, a relation between the sizes of the display surfaces of the three sub-pixels (that is, the R sub-pixel $20_R$, the G sub-pixel $20_G$ and the B sub-pixel $20_B$) can be described as follows. The size of the display surface of the B sub-pixel $20_B$ is very large in comparison with each of the sizes of the display surfaces of the R sub-pixel $20_R$ and the G sub-pixel $20_G$.

The second pixel $20_2$ is configured to include three sub-pixels. The three sub-pixels include two sub-pixels $20_R$ and $20_G$ for displaying the R and G primary colors respectively in addition to a sub-pixel $20_W$ for displaying the predetermined color which is the white color. In this second pixel $20_2$, the sizes of the display surfaces of the R sub-pixel $20_R$ and the G sub-pixel $20_G$ are each made smaller than ⅓ of the total size of the entire second pixel $20_2$. For example, the sizes of the display surfaces of the R sub-pixel $20_R$ and the G sub-pixel $20_G$ are each set at about 80% of ⅓ of the total size of the entire second pixel $20_2$. Then, the remaining area becoming available in the second pixel $20_2$ is allocated to the W sub-pixel $20_W$.

Thus, in the second pixel $20_2$, a relation between the sizes of the display surfaces of the three sub-pixels (that is, the R sub-pixel $20_R$, the G sub-pixel $20_G$ and the W sub-pixel $20_W$) can be described as follows. The size of the display surface of the W sub-pixel $20_W$ is very large in comparison with each of the sizes of the display surfaces of the R sub-pixel $20_R$ and the G sub-pixel $20_G$.

In addition, in the first pixel $20_1$ and the second pixel $20_2$, it is possible to provide a stripe array in which the R sub-pixels $20_R$ are laid out to form a straight line in the column direction whereas the G sub-pixels $20_G$ are also laid out to form a straight line in the column direction. On top of that, in the first pixel $20_1$ and the second pixel $20_2$, it is possible to provide a stripe array in which the B sub-pixels $20_B$ and the W sub-pixels $20_W$ are laid out alternately to form a straight line in the column direction.

As described above, the pixel array according to the second typical implementation is configured into a configuration in which, in a process of adding the W sub-pixel $20_W$ to the second pixel $20_2$ to serve as a substitute for the B sub-pixel $20_B$ missing from the second pixel $20_2$, the sizes of the display surfaces of the R sub-pixel $20_R$ and the G sub-pixel $20_G$ are reduced in order to enlarge each of the sizes of the display surfaces of the B sub-pixel $20_B$ and the W sub-pixel $20_W$ by an increase determined by the reduction of the sizes of the display surfaces of the R sub-pixel $20_R$ and the G sub-pixel $20_G$.

By adoption of the configuration described above, it is possible to obtain the same effects as the pixel array according to the first typical implementation. In addition, since the sizes of the display surfaces of the R sub-pixel $20_R$ and the G sub-pixel $20_G$ are adjusted, there is provided a merit that the freedom to adjust the chromaticity of the white color can be raised to a level higher than that of the pixel array according to the first typical implementation. That is to say, the range for adjusting the chromaticity of the white color can be broadened to a range wider than that of the pixel array according to the first typical implementation.

3-3: Third Typical Implementation

Figure 8:
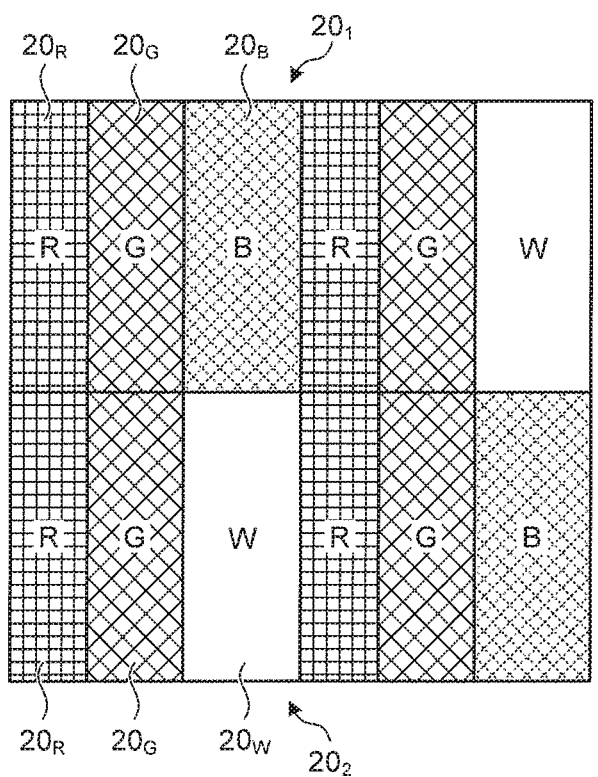
FIG. 8 is a diagram showing the top view of a pixel array according to a third typical implementation of the first embodiment.

FIG. 8 is a diagram showing the top view of a pixel array according to a third typical implementation of the first embodiment. Also in this case, in order to simplify the figure, the figure shows only four adjacent pixels on the upper, lower, left and right sides respectively.

As shown in FIG. 8, in the same way as the pixel arrays according to the first and second typical implementations, the pixel array according to the third typical implementation also includes two first pixels $20_1$ and two second pixels $20_2$. The two first pixels $20_1$ each include three sub-pixels for displaying three primary colors respectively whereas the two second pixels $20_2$ each include three sub-pixels for displaying respectively two colors selected among the three primary colors and a predetermined color other than the three primary colors. The two first pixels $20_1$ and the two second pixels $20_2$ are laid out alternately in the row and column directions to form a pixel matrix.

To put it in detail, the first pixel $20_1$ is configured to include three sub-pixels $20_R$, $20_G$ and $20_B$ for displaying the three RGB primary colors respectively. In this first pixel $20_1$, the size of the display surface of the G sub-pixel $20_G$ is made about equal to ⅓ of the total size of the entire first pixel $20_1$. In addition, the size of the display surface of the R sub-pixel $20_R$ is made smaller than the size of the display surface of the G sub-pixel $20_G$. For example, the size of the display surface of the R sub-pixel $20_R$ is set at about 80% of the size of the display surface of the G sub-pixel $20_G$.

Then, the remaining area becoming available in the first pixel $20_1$ is allocated to the B sub-pixel 20B. Thus, in the first pixel $20_1$, a relation between the sizes of the display surfaces of the three sub-pixels (that is, the R sub-pixel $20_R$, the G sub-pixel $20_G$ and the B sub-pixel $20_B$) can be described as follows. The size of the display surface of the B sub-pixel $20_B$ is largest whereas the size of the display surface of the R sub-pixel $20_R$ is smallest. That is to say, the size of the display surface of the G sub-pixel $20_G$ is between the size of the display surface of the B sub-pixel $20_B$ and the size of the display surface of the R sub-pixel $20_R$.

The second pixel $20_2$ is configured to include three sub-pixels. The three sub-pixels include two sub-pixels $20_R$ and $20_G$ for displaying the R and G primary colors respectively in addition to a sub-pixel $20_W$ for displaying the predetermined color which is the white color. In this second pixel $20_2$, the size of the display surface of the G sub-pixel $20_G$ is about ⅓ of the total size of the entire second pixel $20_2$. That is to say, the size of the display surface of the G sub-pixel $20_G$ in the second pixel $20_2$ is about equal to the size of the display surface of the G sub-pixel $20_G$ in the first pixel $20_1$. Thus, it is possible to provide a stripe array in which the G sub-pixels $20_G$ are laid out to form a straight line in the column direction.

In addition, in the second pixel $20_2$, the size of the display surface of the R sub-pixel $20_R$ is made smaller than the size of the display surface of the G sub-pixel $20_G$. For example, the size of the display surface of the R sub-pixel $20_R$ is set at about 80% of the size of the display surface of the G sub-pixel $20_G$. That is to say, the size of the display surface of the R sub-pixel $20_R$ in the second pixel $20_2$ is about equal to the size of the display surface of the R sub-pixel $20_R$ in the first pixel $20_1$. Thus, it is possible to provide a stripe array in which the R sub-pixels $20_R$ are laid out to form a straight line in the column direction. Then, the remaining area becoming available in the second pixel $20_2$ is allocated to the W sub-pixel $20_W$.

The size of the display surface of the W sub-pixel $20_W$ is about equal to the size of the display surface of the B sub-pixel $20_B$. Thus, it is possible to provide a stripe array in which the B sub-pixels $20_R$ and the W sub-pixels $20_W$ are laid out alternately to form a straight line in the column direction. In addition, in the second pixel $20_2$, a relation between the sizes of the display surfaces of the three sub-pixels (that is, the R sub-pixel $20_R$, the G sub-pixel $20_G$ and the W sub-pixel $20_W$) can be described as follows. The size of the display surface of the W sub-pixel $20_W$ is largest whereas the size of the display surface of the R sub-pixel $20_R$ is smallest. That is to say, the size of the display surface of the G sub-pixel $20_G$ is between the size of the display surface of the W sub-pixel $20_W$ and the size of the display surface of the R sub-pixel $20_R$.

As described above, the pixel array according to the third typical implementation is configured into a configuration in which, in a process of adding the W sub-pixel $20_W$ to the second pixel $20_2$ to serve as a substitute for the B sub-pixel $20_B$ missing from the second pixel $20_2$, the size of the display surface of the R sub-pixel $20_R$ is reduced in order to enlarge the size of the display surface of the B sub-pixel $20_B$ by an increase determined by the reduction of the size of the display surface of the R sub-pixel $20_R$. Nevertheless, it is possible to obtain the same effects as the pixel array according to the first typical implementation.

4: Second Embodiment

The pixel array according to a second embodiment of the present disclosure is a pixel array in which each pixel used as a unit in formation of a color image includes four sub-pixels. The four sub-pixels include three sub-pixels for displaying the three primary colors respectively and one sub-pixel for displaying a predetermined color other than the three primary colors. The pixels are laid out repeatedly in the row and column directions.

In addition, the pixel array according to the second embodiment is characterized in that the size of a sub-pixel for displaying a specific color selected from the three primary colors is made smaller than each of the sizes of the sub-pixels for displaying the two other primary colors but larger than half the size of each of the sub-pixels for displaying the two other primary colors. A concrete typical implementation of the second embodiment is explained below. In the typical implementation, the specific color selected from the three primary colors is the B (blue) color whereas the predetermined color is the W (white) color.

4-1: Typical Implementation

Figure 9:
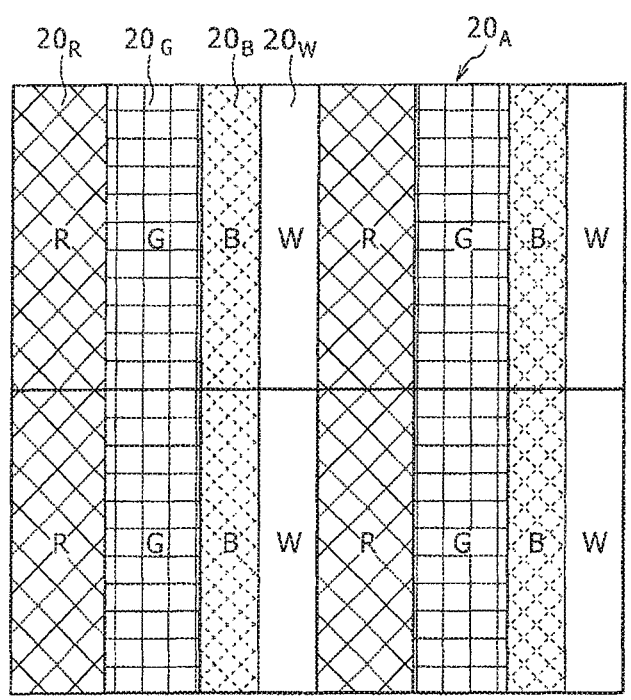
FIG. 9 is a diagram showing the top view of a pixel array according to a typical implementation of a second embodiment.

FIG. 9 is a diagram showing the top view of a pixel array according to a typical implementation of the second embodiment. Also in this case, in order to simplify the figure, the figure shows only four adjacent pixels on the upper, lower, left and right sides respectively.

As shown in FIG. 9, in the pixel array according to the typical implementation of the second embodiment of the present disclosure, each pixel $20_A$ used as a unit in formation of a color image includes four sub-pixels. The four sub-pixels include three sub-pixels $20_R$, $20_G$ and $20_B$ for displaying the three primary colors respectively and one sub-pixel $20_W$ for displaying a predetermined color other than the three primary colors. The pixels are laid out repeatedly in the row and column directions.

In the configuration described above, each of the sizes of the R sub-pixel $20_R$ and the G sub-pixel $20_G$ is set at a value smaller than ⅓ of the size of the pixel $20_A$. In addition, in the case of this typical implementation, the size of the R sub-pixel $20_R$ is made equal to the size of the G sub-pixel $20_G$. An available area is an area remaining in the pixel $20_A$ as a result of subtracting areas allocated to the R sub-pixel $20_R$ and the G sub-pixel $20_G$ from the area of the pixel $20_A$. Thus, the size of the available area is larger than ⅓ of the size of the pixel $20_A$. It is to be noted that the size of the R sub-pixel $20_R$ does not have to be equal to the size of the G sub-pixel $20_G$.

Then, the available area remaining in the pixel $20_A$ as a result of subtracting areas allocated to the R sub-pixel $20_R$ and the G sub-pixel $20_G$ from the area of the pixel $20_A$ is allocated to the B sub-pixel $20_B$ and the W sub-pixel $20_W$. In addition, in the case of this typical implementation, the size of the B sub-pixel $20_B$ is made equal to the size of the W sub-pixel $20_W$. Thus, each of the sizes of the W sub-pixel $20_W$ and the B sub-pixel $20_B$ is smaller than each of the sizes of the R sub-pixel $20_R$ and the G sub-pixel $20_G$ but larger than half the size of each of the R sub-pixel $20_R$ and the G sub-pixel $20_G$. It is to be noted that the size of the B sub-pixel $20_B$ does not have to be equal to the size of the W sub-pixel $20_W$.

As described above, the size of the B sub-pixel $20_B$ for displaying the blue color which is the specific color selected from the three primary colors is made smaller than each of the sizes of the R sub-pixel $20_R$ and the G sub-pixel $20_G$ for displaying the two other primary colors respectively. Since the size of the B sub-pixel $20_B$ is decreased, an available area resulting from the reduction of the size of the B sub-pixel $20_B$ can be allocated to the W sub-pixel $20_W$. In this way, each pixel $20_A$ includes a W sub-pixel $20_W$ increasing the luminance. In addition, each pixel $20_A$ also includes the R sub-pixel $20_G$, the G sub-pixel $20_G$ and the B sub-pixel $20_B$ for displaying all the primary colors. Thus, the resolution is also improved as well.

Figure 10:
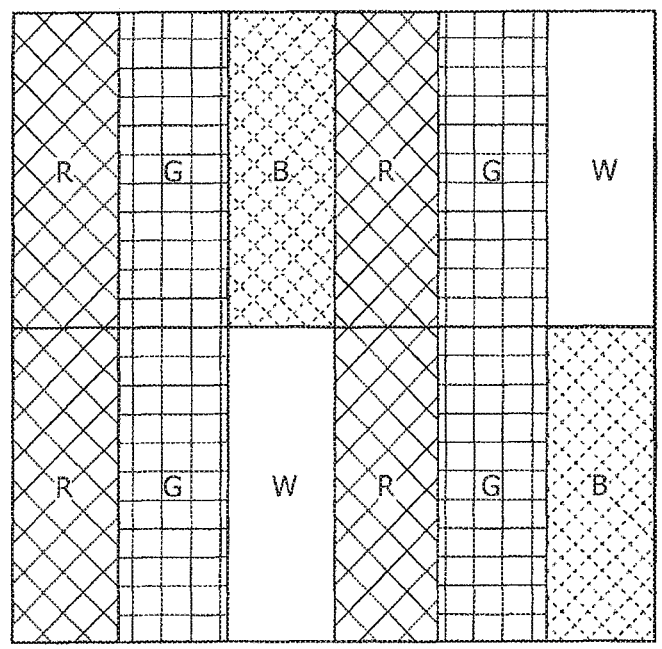
FIG. 10 is a diagram showing the top view of a pixel array including R, G, B and W sub-pixels having the same size.
Figure 11:
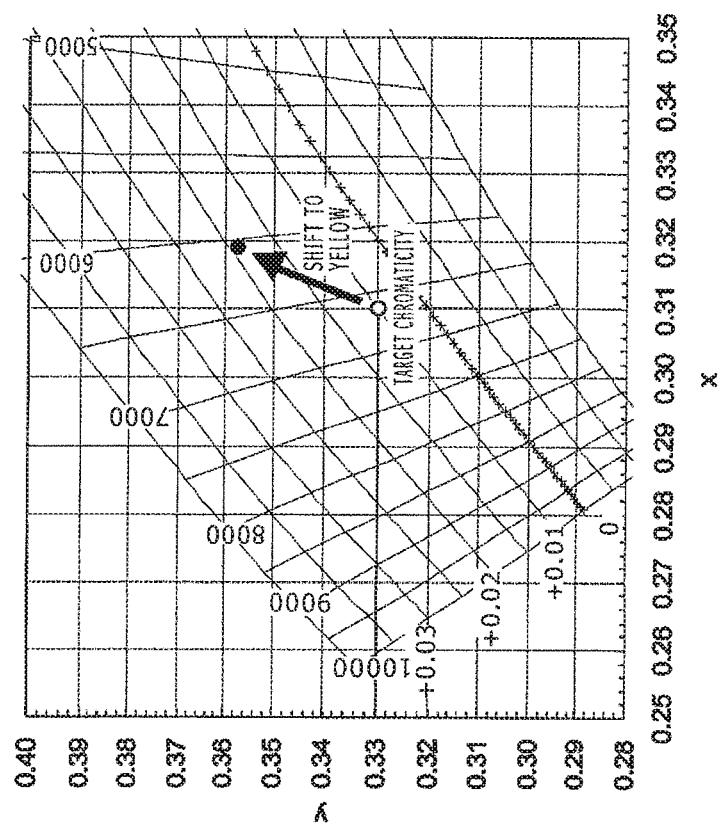
FIG. 11 is an xy chromaticity diagram to be referred to in explanation of yellow-color transition of the chromaticity of the white color.

By the way, if the size of the B sub-pixel $20_B$ is made equal to half the size of each of the R sub-pixel $20_R$ and the G sub-pixel $20_G$, the component of the blue color also becomes half the quantity of each of the color components of the red and green colors. That is to say, this configuration provides the same optical characteristic as a pixel array shown in FIG. 10 as the pixel array according to the existing technology. This optical characteristic raises the problem of the yellow-color transition for the chromaticity of the white color due to the same reason explained earlier in the description of the pixel array according to the existing technology.

On the other hand, the pixel array according to this typical implementation has a configuration in which the size of the B sub-pixel $20_B$ is made larger than half the size of each of the R sub-pixel $20_R$ and the G sub-pixel $20_G$. Thus, in comparison with a configuration in which the size of the B sub-pixel $20_B$ is made equal to half the size of each of the R sub-pixel $20_R$ and the G sub-pixel $20_G$, the component of the blue color also becomes large. As a result, it is possible to decrease a shift caused by the yellow-color transition as a shift of the chromaticity of the white color. In addition, without means adopted in a light blocking film referred to as a black matrix or in a light blocking metal on a TFT array side to serve as means for blocking light propagating through desired sub-pixels, it is possible to decrease a shift caused by the yellow-color transition as a shift of the chromaticity of the white color. Thus, it is possible to improve performance deteriorations caused by the yellow-color transition of the chromaticity of the white color while sustaining the transmittance of the display panel.

5: Liquid-Crystal Display Apparatus of a Horizontal Electric-Field Mode

The above descriptions explain a liquid-crystal display apparatus serving as a display apparatus for showing color displays. The operating mode of the liquid-crystal display apparatus is not prescribed in particular. In the case of a horizontal electric-field mode, however, it is desirable to adopt countermeasures described as follows.

In the case of a horizontal electric-field mode, the pattern of the transparent pixel electrode has a comb-tooth shape. In addition, if the size of a sub-pixel is changed, the aperture ratio is adjusted by changing a comb-tooth count which is the number of comb teeth. If the number of comb teeth is changed, however, the area of the pixel electrode varies from sub-pixel to sub-pixel. Thus, the pixel capacitance also varies as well. In some cases, the variations of the pixel capacitance raise a problem of worsening flickers and a problem of deteriorating printing.

Thus, it is desirable to conduct a design in which the area of the pixel electrode is typically adjusted for insertion as much as possible by making use of an area not contributing to the transmittance of the display panel. A typical example of the area not contributing to the transmittance of the display panel is a light blocking area having no optical effects. To put it concretely, the areas of pixel electrodes are made uniform by, for example, increasing the areas of the pixel electrodes for sub-pixels each having a reduced comb-tooth count. In this case, the technical term 'uniform' implies not only 'strictly uniform,' but also 'substantially uniform.' Existence of a variety of variations generated at the design stage or the manufacturing stage is tolerated.

In addition, if the problem of worsening flickers and the problem of deteriorating printing are caused by a shift of the DC common voltage $V_{com}$ applied to sub-pixels as shown in FIG. 2 from an optimum level, it is desirable to adopt a countermeasure described below. It is to be noted that the shift of the DC common voltage $V_{com}$ is caused by variations of the pixel capacitances of the individual sub-pixels.

If the problems are caused by such a shift, the driver IC of the liquid-crystal display apparatus is provided with a function for independently controlling the center values of signal levels of the sub-pixels by typically giving offsets independently to the center values. With such a function, the shift of the DC common voltage $V_{com}$ can be cancelled so that it is possible to solve the problem of worsening flickers and the problem of deteriorating printing. As described above, the shift of the DC common voltage $V_{com}$ is caused by variations of the pixel capacitances of the sub-pixels.

6: Electronic Equipment

The display apparatus provided by the embodiments of the present disclosure as described above can be applied to electronic equipment in all fields. In this case, the display apparatus functions as a display section employed in the electronic equipment. The display section is a section for displaying a video signal supplied to the electronic equipment or a video signal generated in the electronic equipment. The video signal is displayed as an image or a video picture.

As is obvious from the earlier descriptions of the embodiments, the display apparatus according to the embodiments of the present disclosure is characterized in that the display apparatus is capable of reducing the shift of the chromaticity of the white color to the side of the supplementary-color system while enhancing the display performance such as the luminance so that more excellent color displays can be implemented. Thus, by applying the display apparatus according to the embodiments of the present disclosure to electronic equipment in all fields as the display section of the equipment, the equipment can be made capable of implementing more excellent color displays.

Typical examples of the electronic equipment employing the display apparatus according to the embodiments of the present disclosure as the display section of the equipment are a digital camera, a video camera, a PDA (Personal Digital Assistant), a game machine, a notebook personal computer, a mobile information terminal such as an electronic book and a mobile communication terminal such as a cellular phone.

7: Configurations of the Disclosure

It is to be noted that the present disclosure can also be realized into the following implementations.

1. A display apparatus including:
a first pixel including three sub-pixels for displaying three primary colors respectively; and
a second pixel including three sub-pixels for displaying two colors selected among the three primary colors and a predetermined color other than the three primary colors,
wherein, in the first pixel, the size of the display surface of a sub-pixel for displaying a specific color included in the three primary colors as a specific color missing from the second pixel is larger than each of the sizes of the display surfaces of the two other sub-pixels for displaying the two other primary colors respectively.

2. The display apparatus according to implementation 1 wherein, in the second pixel, the size of the display surface of the sub-pixel for displaying the predetermined color is larger than each of the sizes of the display surfaces of the two other sub-pixels for displaying respectively the two primary colors selected among the three primary colors.

3. The display apparatus according to implementation 1 or 2 wherein the size of the display surface of a sub-pixel included in the first pixel to serve as the sub-pixel for displaying the specific color selected among the three primary colors is equal to the size of the display surface of a sub-pixel included in the second pixel to serve as the sub-pixel for displaying the predetermined color.

4. The display apparatus according to any one of implementations 1 to 3 wherein the first pixels and the second pixels are laid out alternately in a direction parallel to pixel rows and a direction parallel to column rows.

5. The display apparatus according to any one of implementations 1 to 4 wherein the predetermined color is a white color.

6. The display apparatus according to any one of implementations 1 to 5 wherein the specific color selected among the three primary colors as a color missing from the second pixel is a blue color.

7. The display apparatus according to implementation 6 wherein:
in the first pixel, the size of the display surface of the sub-pixel for displaying the blue color is larger than the size of the display surface of the sub-pixel for displaying a green color; and
in the second pixel, the size of the display surface of the sub-pixel for displaying the white color is larger than the size of the display surface of the sub-pixel for displaying the green color.

8. The display apparatus according to implementation 7 wherein, in the first and second pixels, the size of the display surface of the sub-pixel for displaying a red color is larger than the size of the display surface of the sub-pixel for displaying the green color.

9. The display apparatus according to implementation 7 wherein, in the first and second pixels, the size of the display surface of the sub-pixel for displaying a red color is equal to the size of the display surface of the sub-pixel for displaying the green color.

10. The display apparatus according to implementation 9 wherein:
in the first pixel, the size of the display surface of the sub-pixel for displaying the blue color is larger than the sum of the size of the display surface of the sub-pixel for displaying the red color and the size of the display surface of the sub-pixel for displaying the green color; and
in the second pixel, the size of the display surface of the sub-pixel for displaying the white color is larger than the sum of the size of the display surface of the sub-pixel for displaying the red color and the size of the display surface of the sub-pixel for displaying the green color.

11. The display apparatus according to implementation 7 wherein, in the first and second pixels, the size of the display surface of the sub-pixel for displaying the green color is larger than the size of the display surface of the sub-pixel for displaying a red color.

12. A display apparatus having pixels each including four sub-pixels for displaying respectively three primary colors and a predetermined color other than the three primary colors wherein the size of the sub-pixel for displaying a specific color selected from the three primary colors is smaller than each of the sizes of the sub-pixels for displaying the two other primary colors but larger than half the size of each of the sub-pixels for displaying the two other primary colors.

13. The display apparatus according to implementation 12 wherein the size of the sub-pixel for displaying the specific color selected from the three primary colors is equal to the size of the sub-pixel for displaying the predetermined color.

14. The display apparatus according to implementation 12 or 13 wherein the pixels are laid out repeatedly in a direction parallel to pixel rows and a direction parallel to column rows.

15. The display apparatus according to any one of implementations 12 to 14 wherein the predetermined color is a white color.

16. The display apparatus according to any one of implementations 12 to 15 wherein the specific color selected among the three primary colors is a blue color.

17. The display apparatus according to implementation 16 wherein the size of the sub-pixel for displaying the blue color is equal to the size of the sub-pixel for displaying the predetermined color.

18. The display apparatus according to implementation 16 wherein the size of the sub-pixel for displaying a red color is equal to the size of the sub-pixel for displaying a green color.

19. Electronic equipment including a display apparatus including:
a first pixel including three sub-pixels for displaying three primary colors respectively; and
a second pixel including three sub-pixels for displaying two colors selected among the three primary colors and a predetermined color other than the three primary colors,
wherein, in the first pixel, the size of the display surface of a sub-pixel for displaying a specific color included in the three primary colors as a specific color missing from the second pixel is larger than each of the sizes of the display surfaces of the two other sub-pixels for displaying the two other primary colors respectively.

20. Electronic equipment employing a display apparatus having pixels each including four sub-pixels for displaying respectively three primary colors and a predetermined color other than the three primary colors wherein each of the size of the sub-pixel for displaying a specific color selected from the three primary colors and the size of the sub-pixel for displaying the predetermined color is smaller than each of the sizes of the sub-pixels for displaying the two other primary colors.

The present disclosure contains subject matter related to that disclosed in Japanese Priority Patent Application JP 2011-257336 filed in the Japan Patent Office on Nov. 25, 2011, the entire content of which is hereby incorporated by reference.

It should be understood by those skilled in the art that various modifications, combinations, sub-combinations and alterations may occur depending on design requirements and other factors in so far as they are within the scope of the appended claims or the equivalents thereof.

What is claimed is:

1. A display apparatus comprising:
   a first pixel including a first sub-pixel for displaying a first primary color, a second sub-pixel for displaying a second primary color, and a third sub-pixel for displaying a third primary color; and
   a second pixel including a first sub-pixel for displaying the first primary color, a second sub-pixel for displaying the second primary color, and a fourth sub-pixel for displaying a fourth color that is different from the first primary color, the second primary color, and the third primary color,
   wherein, in the first pixel, an area of the first sub-pixel is substantially $4/15$ of an area of the first pixel, an area of the second sub-pixel that is between the first sub-pixel and the third sub-pixel in a first direction is substantially $1/3$ of the area of the first pixel, and an area of the third sub-pixel that is adjacent to the second sub-pixel in the first direction is substantially $2/5$ of the area of the first pixel; and
   wherein, in the second pixel, an area of the first sub-pixel is substantially $4/15$ of an area of the second pixel, an area of the second sub-pixel that is between the first sub-pixel and the fourth sub-pixel in the first direction is substantially $1/3$ of the area of the second pixel, and an area of the fourth sub-pixel that is adjacent to the second sub-pixel in the first direction is substantially $2/5$ of the area of the second pixel.

2. The display apparatus according to claim 1, wherein the area of the third sub-pixel in the first pixel is substantially equal to the area of the fourth sub-pixel that displays the fourth color in the second pixel.

3. The display apparatus according to claim 1, wherein the first pixel and the second pixel are laid out alternately in a direction parallel to pixel rows and a direction parallel to pixel columns.

4. The display apparatus according to claim 1, wherein the first primary color is red, the second primary color is green, and the third primary color is blue.

5. The display apparatus according to claim 1, wherein the fourth color is white.

6. The display apparatus according to claim 4, wherein the fourth color is white.

7. The display apparatus according to claim 1, wherein:
   the first pixel consists of the first sub-pixel, the second sub-pixel, and the third sub-pixel; and
   the second pixel consists of the first sub-pixel, the second sub-pixel, and the fourth sub-pixel.

8. An electronic device including a display apparatus comprising:
   a first pixel including a first sub-pixel for displaying a first primary color, a second sub-pixel for displaying a second primary color, and a third sub-pixel for displaying a third primary color; and
   a second pixel including a first sub-pixel for displaying the first primary color, a second sub-pixel for displaying the second primary color, and a fourth sub-pixel for displaying a fourth color that is different from the first primary color, the second primary color and the third primary color,
   wherein, in the first pixel, an area of the first sub-pixel is substantially $4/15$ of an area of the first pixel, an area of the second sub-pixel that is between the first sub-pixel and the third sub-pixel in a first direction is substantially $1/3$ of the area of the first pixel, and an area of the third sub-pixel that is adjacent to the second sub-pixel in the first direction is substantially $2/5$ of the area of the first pixel; and
   wherein, in the second pixel, an area of the first sub-pixel is substantially $4/15$ of an area of the second pixel, an area of the second sub-pixel that is between the first sub-pixel and the fourth sub-pixel in the first direction is substantially $1/3$ of the area of the second pixel, and an area of the fourth sub-pixel that is adjacent to the second sub-pixel in the first direction is substantially $2/5$ of the area of the second pixel.

9. The electronic device according to claim 8, wherein the area of the third sub-pixel in the first pixel is substantially equal to the area of the fourth sub-pixel that displays the fourth color in the second pixel.

10. The electronic device according to claim 8, wherein the first pixel and the second pixel are laid out alternately in a direction parallel to pixel rows and a direction parallel to pixel columns.

11. The electronic device according to claim 8, wherein the first primary color is red, the second primary color is green, and the third primary color is blue.

12. The electronic device according to claim 11, wherein the fourth color is white.

13. The electronic device according to claim 8, wherein the fourth color is white.

14. The electronic device according to claim 8, wherein:
   the first pixel consists of the first sub-pixel, the second sub-pixel, and the third sub-pixel; and
   the second pixel consists of the first sub-pixel, the second sub-pixel, and the fourth sub-pixel.

* * * * *